(12) United States Patent
Fischer et al.

(10) Patent No.: US 7,874,816 B2
(45) Date of Patent: Jan. 25, 2011

(54) FUEL PUMP END CAP WITH ISOLATED SHUNT WIRES

(75) Inventors: John G. Fischer, Goodrich, MI (US); Robert J. W. Ball, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 613 days.

(21) Appl. No.: 11/863,600

(22) Filed: Sep. 28, 2007

(65) Prior Publication Data
US 2009/0087324 A1    Apr. 2, 2009

(51) Int. Cl.
*F04B 35/04* (2006.01)

(52) U.S. Cl. .............. 417/423.14; 417/423.7; 417/423.3; 310/329

(58) Field of Classification Search ............ 417/423.3, 417/423.7, 423.14, 410.1, 410.3; 310/329
See application file for complete search history.

(56) References Cited

U.S. PATENT DOCUMENTS

| | | | |
|---|---|---|---|
| 4,822,258 A | | 4/1989 | Matsuda et al. |
| 4,845,393 A | * | 7/1989 | Burgess et al. ............. 310/51 |
| 5,221,130 A | * | 6/1993 | Satoh et al. ............... 310/239 |
| 5,465,016 A | * | 11/1995 | Mancl et al. ............... 310/71 |
| 5,697,769 A | * | 12/1997 | Kobman et al. ............ 417/410.3 |
| 5,961,293 A | * | 10/1999 | Clemmons et al. ......... 417/44.2 |
| 6,541,883 B2 | * | 4/2003 | Uffelman ................. 310/71 |
| 6,655,365 B2 | | 12/2003 | Beyer et al. |

FOREIGN PATENT DOCUMENTS

| | | |
|---|---|---|
| DE | 4037180 | 5/1991 |
| DE | 9112104 | 1/1993 |
| DE | 19639009 | 3/1997 |
| DE | 19921539 | 11/2000 |

OTHER PUBLICATIONS

Delphi Powertrain Systems, "Delphi Series 7000 Fuel Module.", 2005.
EP Search Report dated Nov. 6, 2009.

* cited by examiner

*Primary Examiner*—Devon C Kramer
*Assistant Examiner*—Peter J Bertheaud
(74) *Attorney, Agent, or Firm*—Thomas N. Twomey

(57) ABSTRACT

An end cap assembly for an in-tank fuel pump is configured to close an open end of a pump housing and includes an end cap body and a companion clip. On the bottom side of the end cap body facing the pump housing is a pair of motor brush wells for holding a pair of DC motor brushes. A pair of blind bores are provided to receive corresponding RFI suppression circuits. A pair of pockets are located in between the wells and the bores to allow flexible shunt wires to connect the RFI suppression circuits with the brushes. The clip is adapted for insertion into the bottom of the end cap body wherein a pair of axially-extending legs are guided into and seal the pockets. The captured shunt wires are electrically isolated in the closed pockets and contact with fuel is minimized.

11 Claims, 5 Drawing Sheets

FUEL PUMP END CAP WITH ISOLATED SHUNT WIRES

TECHNICAL FIELD

The present invention relates generally to fuel system components and more particularly to a fuel pump end cap assembly with isolated shunt wires.

BACKGROUND OF THE INVENTION

Referring to FIG. 10, it is known to provide an electrically-operated, in-tank fuel pump 100. Pump 100 includes a main pump housing 102 and an end cap 104. It is common to equip electrical pumps of this type with a brush type (e.g., DC) electric motor. End cap 104 includes a fluid outlet 106 for outputting the flow of pumped fuel, and an electrical connector 108 that includes a pair of electrical terminals configured for connection to an external wiring harness, for example. The electrical terminals of the connector 108 are typically used for providing positive and negative polarity DC voltage to the pump to energize the electric motor. The DC voltage across the positive and negative terminals is subsequently applied via a pair of DC motor brushes to a motor armature or the like. The DC motor brushes (not shown in FIG. 10) are typically spring-biased to allow for movement during the operating life of the pump 100 (i.e., to maintain a positive contact as the brushes themselves wear out). In view of this, it also known to provide a pair of so-called flexible shunt wires, which may be braided wires, to connect each of the electrical terminals to its respective brush. However, when the pump 100 is used in high alcohol content based fuels or other fuels with increased electrical conductivity, the flexible shunt wires are subject to, and in-fact experience, degradation. In particular, electrolysis of the positive shunt wire causes metal loss, which may ultimately result in an open circuit condition, causing a failed fuel pump.

FIGS. 11-13 show one approach taken in the art to address this problem, with FIG. 11 being a top view and FIGS. 12 and 13 being cross-sectional views taken substantially along lines 12-12 and 13-13 in FIG. 11, respectively. This approach calls for protecting the shunt wires from electrolysis by arranging the brushes with axial shunt wires that are contained in the same bore that houses the motor brush (i.e., are isolated within the brush bore and thus electrically isolated from the other, opposite polarity shunt wire/terminal). FIG. 13 shows a pair of bores 110 with respective brushes 112 and shunt wires 114. By creating a high resistance electrical path between the anode and cathode, any adverse effect of electrolysis is minimized. However, the axial shunt design is undesirable due to the difficulty in integrating the shunt wire into a radio frequency suppression circuit. For example, a common RFI circuit includes a coil and ferromagnetic core assembly, which in this conventional approach would have to occupy the same axial space as the springs that bias the brushes. Accordingly, for axial shunt wire designs, it is common to include a secondary RFI module 116 and electrical connector, offset from axial alignment, as required to accomplish this function, as seen in FIG. 12.

FIGS. 14-15 show another approach taken in the art, namely, a side-connected shunt wire design. FIG. 14 is a partially broken away side view of an end cap showing an electrical terminal 118, a first end 120 of a coil 122, a second end 124 of the coil 122, a core 126, a flexible shunt wire 128 and a side-mounted connection 130 to brush 132. A desirable method to integrate the brush 132 and shunt wire 128 into an radio frequency interference (RFI) suppression circuit is to use a side shunt design that provides for the shunt wire attachment directly to the RFI circuit (i.e., coil and core) in a design that integrates the brushes, RFI circuit and electrical terminals all in one brush carrier or end cap assembly. However, this known method provides no electrical isolation between the opposite polarity shunt wires, as would be needed to minimize or prevent electrolysis. FIG. 15 shows a positive polarity shunt wire 134, a negative polarity shunt wire 136 and a path 138 through which electrolysis proceeds in the presence of an electrically conductive fuel.

There is therefore a need for a fuel pump end cap assembly that minimizes or eliminates one or more of the problems set forth above.

SUMMARY OF THE INVENTION

The present invention provides the means for electrically isolating the flexible shunt wires of an in-tank fuel pump end cap, while maintaining the use of the more desirable, lower cost side-orientation shunt wire-to-brush connection and integrated RFI design.

An end cap assembly for an in-tank fuel pump includes an end cap body and a clip. The end cap body (or carrier) extends generally along an axis and is configured to close an opening of a pump housing. The end cap body includes a fuel outlet and a connector having positive and negative polarity electrical terminals. On the bottom side of the body (i.e., the side opposite the fuel outlet and connector), a pair of brush wells are formed and are configured to receive a corresponding pair of motor brushes. Also on the bottom side are a pair of blind bores each of which is configured to receive a respective radio frequency interference (RFI) suppression circuit. The end cap body further includes a pair of pockets each of which are located adjacent to the brush well and corresponding RFI bore, and are each configured (e.g., with an opening) to allow a flexible shunt wire to pass through for connecting the brush to the RFI suppression circuit.

The clip includes a pair of axially-extending legs. The clip is configured to be inserted into the bottom of the end cap body, where each leg slides into one of the pockets, closing the pocket and capturing and isolating the shunt wire. The isolated shunt wires are thus substantially, electrically isolated from surfaces of opposite electrical polarity, minimizing or eliminating the occurrence of electrolysis. The isolated pockets also protect the shunt wires from chemical corrosion by limiting exposure to chemical agents (e.g., sulfur) in the fuel. The closed, sealed pockets prevent replenishment of such chemical agents from surrounding fuel, thereby reducing the concentration thereof (which reduces corrosion).

Other objects, features and advantages are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
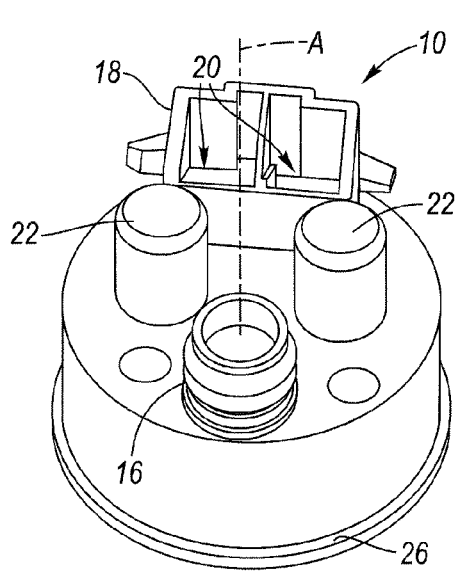
FIG. 1 is a top, perspective view of an embodiment of an end cap assembly according to the invention.
Figure 10:
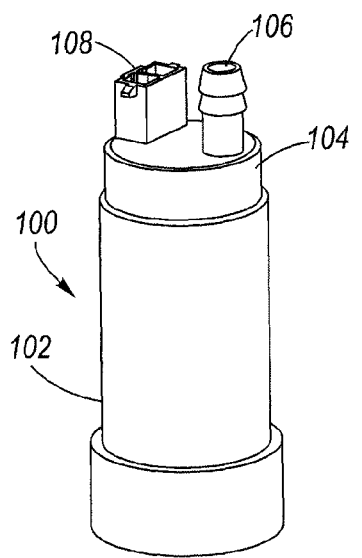
FIG. 10 is a perspective view of a prior art in-tank electrical fuel pump with end cap.
Figure 11:
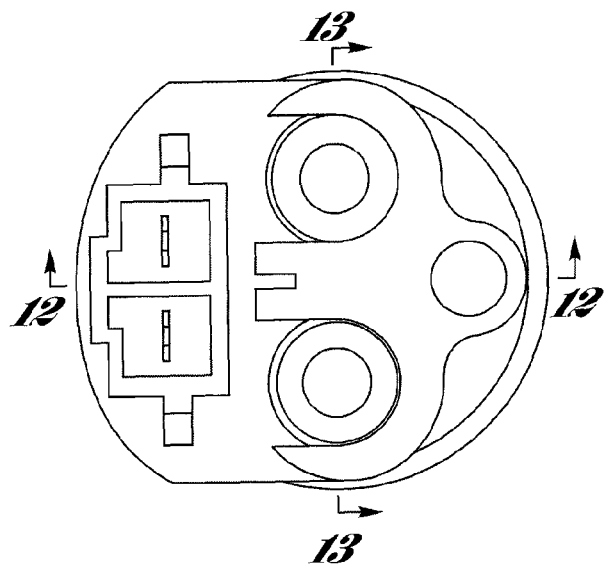
FIGS. 11-13 show one prior art end cap incorporating an axially-disposed shunt wire design.
Figure 12:
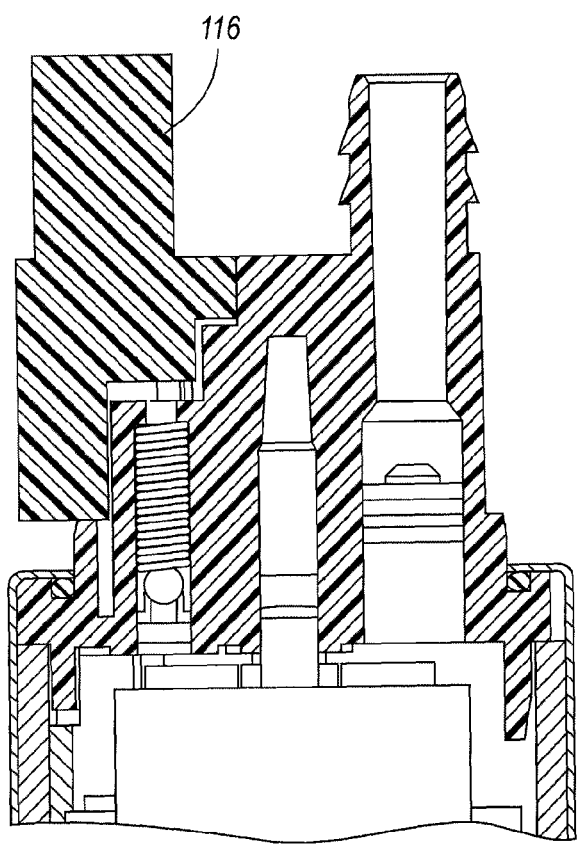
Figure 13:
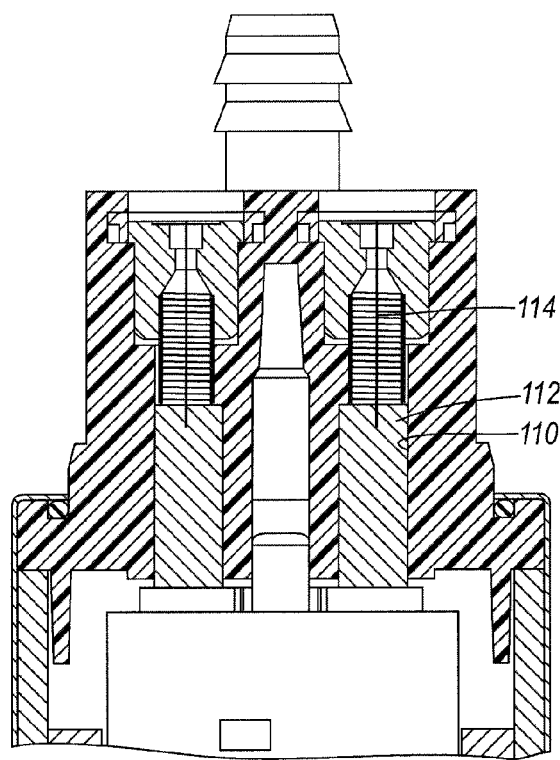
Figure 14:
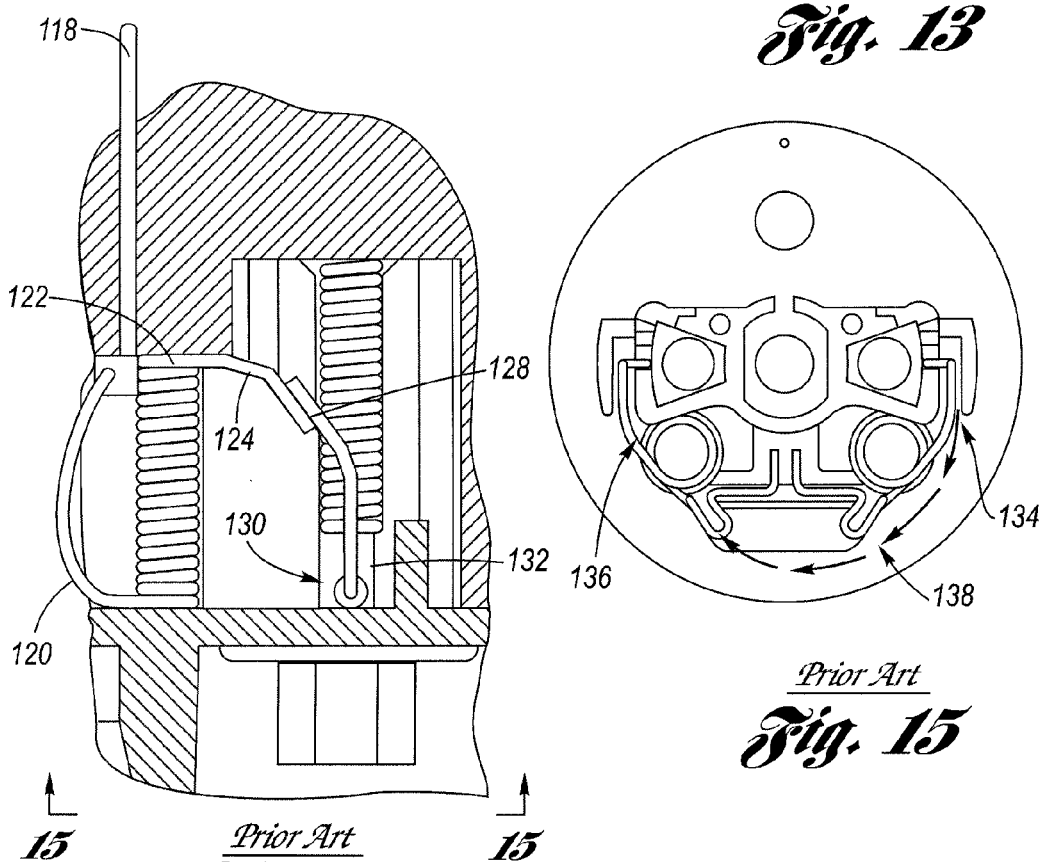
FIGS. 14-15 show another prior art end cap incorporating a side shunt wire design.
Figure 15:
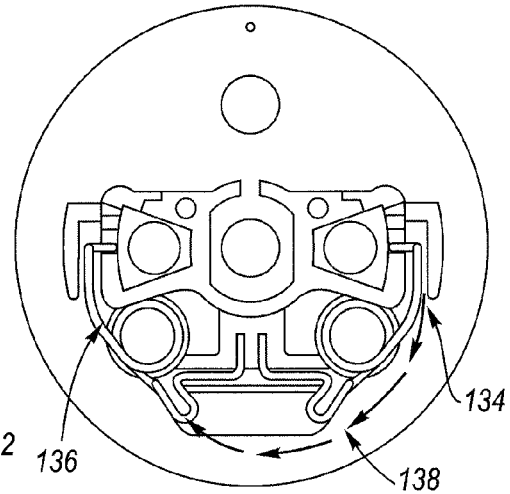

Referring now to the drawings wherein like reference numerals are used to identify identical components in the various views, FIG. 1 is a top perspective view of an end cap assembly 10 for use in an in-tank fuel pump, such as like the fuel pump 100 with fuel pump housing 102 shown in FIG. 10. Being an in-tank variety of fuel pump, the end cap assembly and the pump housing are configured to be disposed in a reservoir of fuel (e.g., fuel tank) where contact with fuel is expected. The end cap assembly 10 includes an end cap body (or carrier) 12 and a clip 14 (best shown in FIG. 3). Body 12 may be fabricated using conventional materials suitable for use in an environment where exposure to various fuels, including gasoline and gasoline/alcohol blends, are expected. For example, polyphenolsulfide (PPS) may be used for the end cap body 12. In the illustrated embodiment, end cap body 12 is generally cylindrical, extending along a main axis "A". However, it should be understood that the body 12 need not be cylindrical, only that it be configured to close an opening in pump housing, such as pump housing 102 (FIG. 10).

Body 12 includes a fuel outlet 16 configured to provide a pumped flow of fuel to an external tube or the like. In the illustrated embodiment, outlet 16 is barbed; however, this is a matter of design choice, and in any embodiment, outlet 16 would be adapted to meet the particular interface requirements of that application. Body 12 further includes a connector 18, which in the illustrated embodiment has electrical terminals 20 disposed therein. In an embodiment where the in-tank fuel pump is DC motor-based, the electrical terminals 20 would include at least a positive polarity and a negative polarity electrical terminal for providing a DC voltage for energizing the DC motor. It should be appreciated that other variations are possible, and the particular type of motor selected would determine the configuration of the needed electrical terminals.

Body 12, as shown, also includes a pair of axially-extending, hollow towers 22, which define a corresponding pair of motor brush wells 24, which having openings that may be accessed from the bottom side of the body 12 (i.e., the side that would face towards the pump housing). Finally, the body 12 includes suitable structural and functional attachment and sealing features 26 that allow it to close an opening of the pump housing. The attachment and sealing features 26 may reflect conventional approaches taken in the art for these purposes.

Figure 2:
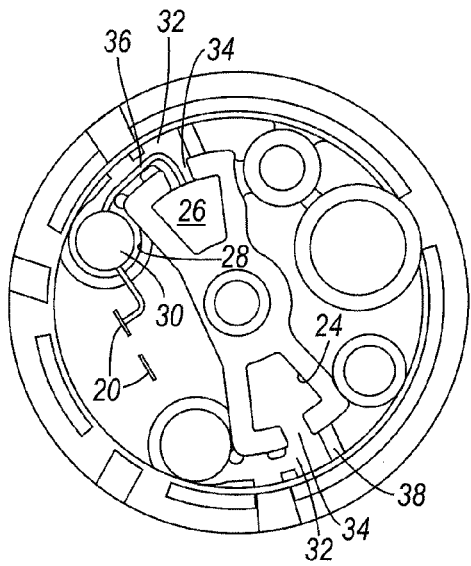
FIG. 2 is a bottom, perspective view of an end cap body of FIG. 1, without a cooperating clip installed.

FIG. 2 is a perspective view of the end cap body 12 as viewed toward the bottom side, but without the clip 14 installed. FIG. 2 shows the brush wells 24 each containing one of a corresponding pair of motor brushes 26. As known, the brushes 26 comprise electrically conductive material and function to apply the voltages to a motor armature or the like, for example a DC voltage where a DC motor is being energized.

Body 12 also includes a pair of blind bores 28 that are configured to receive a corresponding radio frequency interference (RFI) suppression circuit 30. In the illustrated embodiment, the blind bores 28 are circular in shape due to the fact that a common RFI suppression circuit is cylindrical in shape (i.e., includes a coil formed around a ferromagnetic cylindrical-shaped core). However, it should be understood that this is exemplary only and not limiting in nature. The blind bores 28 may be configured to correspond to the particular packaging in which the desired RFI suppression circuit in provided.

FIG. 2 shows that the end cap body 12 further includes a pair of axially-extending pockets 32 formed by various walls internal to the body 12. Each pocket 32 has access to an adjacent brush well 24 by virtue of a respective axially-extending slot 34. This arrangement allows a flexible shunt wire 36 that is disposed in pocket 32 to pass through the slot 34 into the brush well 24 for a side-connection to brush 26. FIG. 2 also shows that pocket 32 is defined, in-part, by a recessed, fixed-wall 38. FIG. 2 also shows the electrical terminals 20, each of which are connected to a respective RFI suppression circuit 30. In turn, each RFI circuit 30 is connected to an associated motor brush 26 by way of a respective flexible shunt wire 36.

Figure 3:
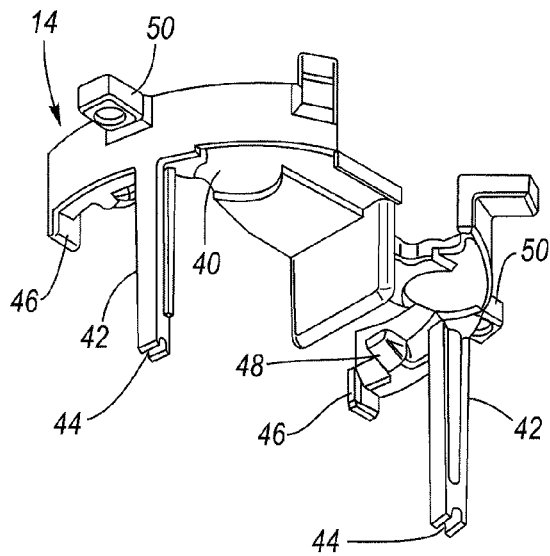
FIG. 3 is a perspective view of clip for use with the end cap body.

FIG. 3 is a perspective view of clip 14. Clip 14 is configured to be inserted into the bottom side of end cap body 12 to close the pockets 32, in a manner described in greater detail below. Clip 14 includes a base 40, a pair of axially-extending legs 42 each including a respective notch 44 on a distal end thereof, a pair of end walls 46, a pair of slot closure members 48 and a pair of key members 50. Clip 14 may comprise plastic material suitable for use in environments where exposure to fuel is contemplated. For example, acetal copolymer may be used for clip 14.

The base 40 of clip 14 extends out in a generally semi-circular shape, in manner generally matched to the shape of the end cap body 12. The notch 44 on the end of each of the legs 42 may be generally concave and sized to capture the flexible shunt wire 36 when the clip 14 is inserted. To form a completely closed pocket 32, the clip 14 includes a number of enabling features. First, the notch 44 described above is configured to seal to the bottom of the pocket 32 upon full insertion of the clip 14. Second, the end wall 46 of clip 14 is configured to abut the fixed wall 38 of body 12 (best shown in FIG. 8). Third, the slot closure member 48 of clip 14 is configured to cover the slots 34 of body 12 (also best shown in FIG. 8).

Figure 4:
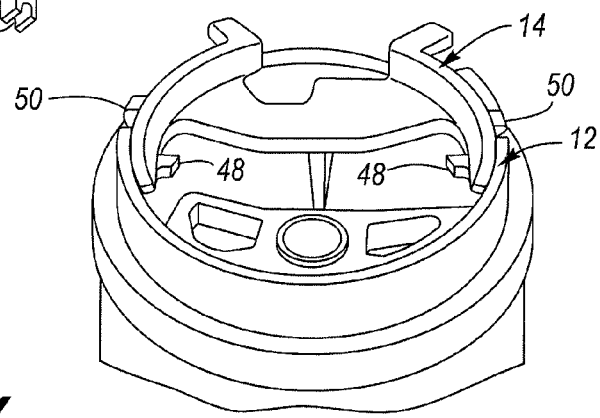
FIG. 4 is a bottom, perspective view showing the clip of FIG. 3 partially installed in the end cap body.

FIG. 4 shows the clip 14 in a partially inserted state relative to the end cap body 12. Note the key members 50 on clip 14 help orient the clip 14 correctly for insertion into the body 12. FIG. 4 also shows both of the slot closure members 48 (i.e., one the closure members 48 was obscured in FIG. 3).

Figure 5:
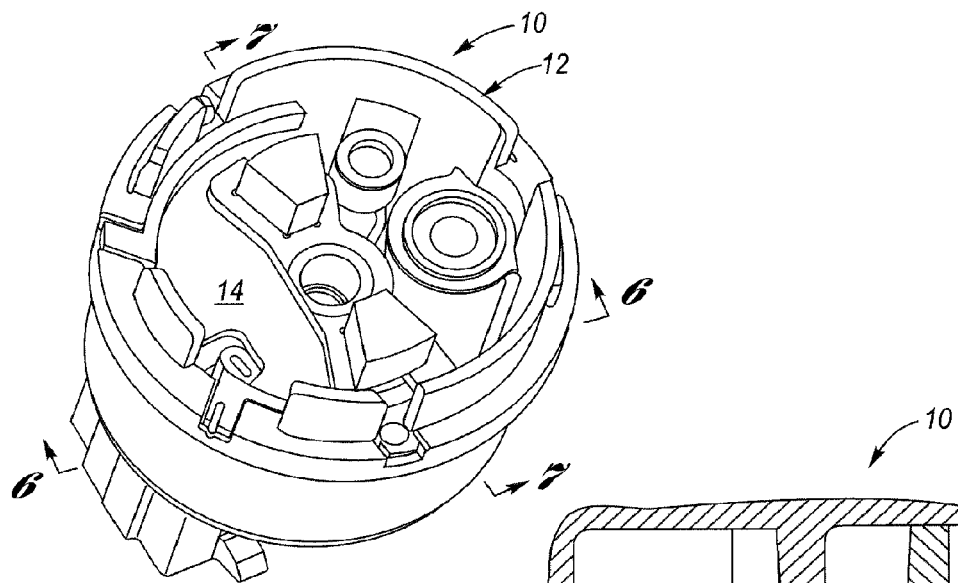
FIG. 5 is a bottom, perspective view of the end cap assembly with the clip of FIG. 3 fully installed.

FIG. 5 shows the clip 14 fully inserted into the end cap body 12.

Figure 6:
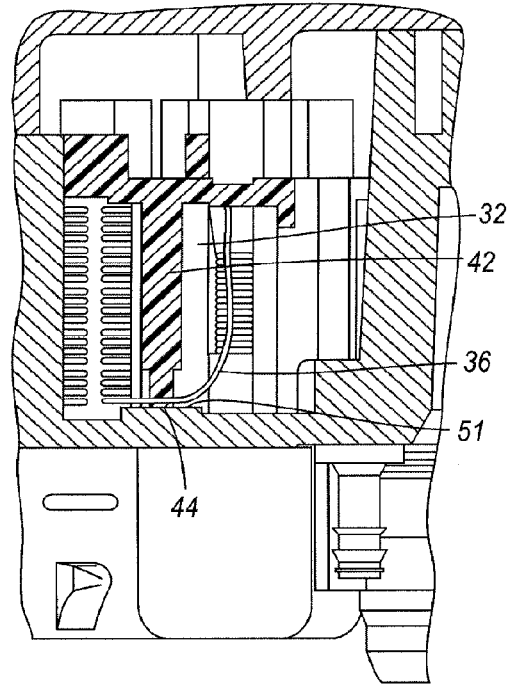
FIG. 6 is a partial, cross-sectional view taken substantially along lines 6-6 of FIG. 5 showing a leg of the clip capturing the flexible wire shunt.

FIG. 6 is a cross-sectional view taken substantially along lines 6-6 in FIG. 5. FIG. 6 shows that the pocket 32 becomes sealed when the clip 14 is fully inserted by virtue of a closure wall formed by leg 42. It should be appreciated that when the clip is fully inserted, the notch 44 not only captures flexible shunt wire 26 but also creates a seal against the floor 51 of the pocket 32.

Figure 7:
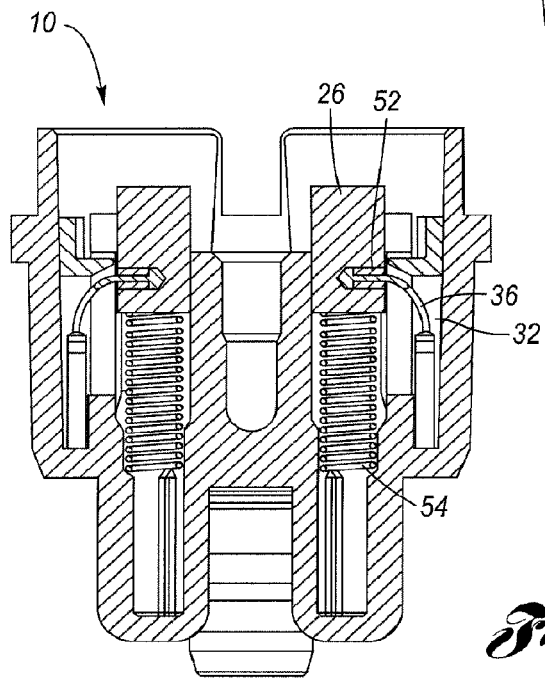
FIG. 7 is an enlarged, cross-sectional view taken substantially along lines 7-7 of FIG. 5 showing the formed isolation pockets.

FIG. 7 is a cross-sectional view taken substantially along lines 7-7 in FIG. 5. FIG. 7 also shows the sealed pocket 32 that is created when the clip 14 is fully inserted in body 12. FIG. 7 additionally shows the side-connection 52 of the flexible shunt wire 36 to the brush 26. FIG. 7 also shows a pair of springs 52 that bias brushes 26 axially outwardly from brush wells 24.

Figure 8:
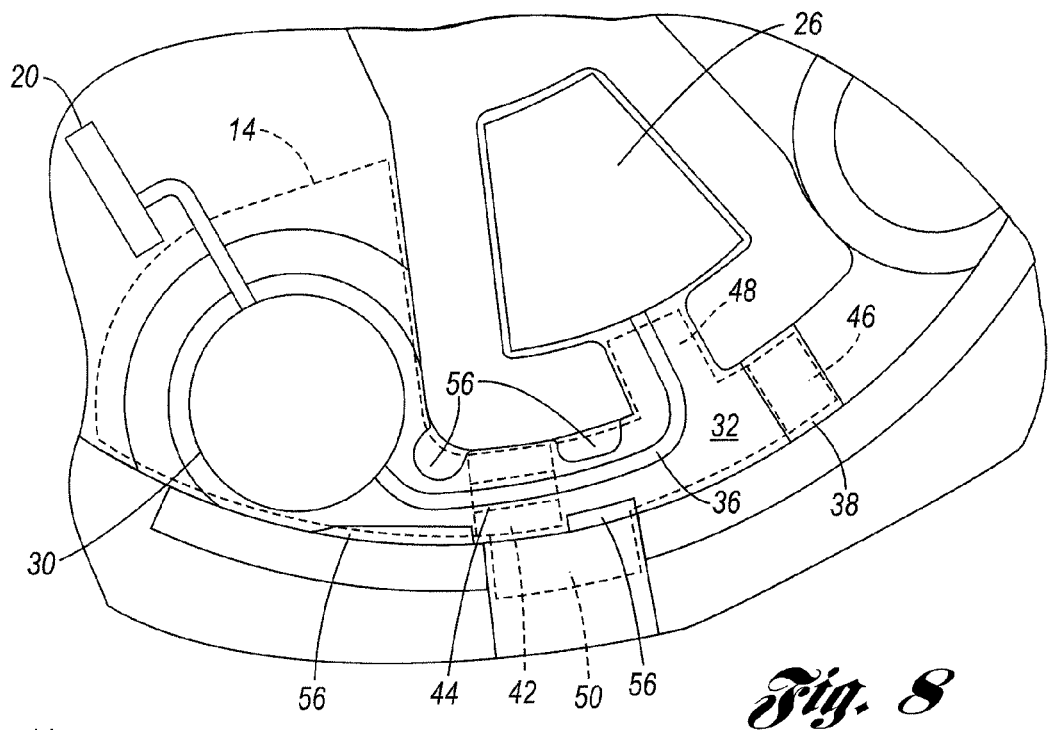
FIG. 8 is an enlarged, perspective view of FIG. 2.

FIG. 8 is an enlarged view looking towards the bottom of the end cap body 12. First, FIG. 8 shows the electrical connections starting with the electrical terminal 20, which is then connected to RFI suppression circuit 30 by way a lead wire. RFI suppression circuit 30, in turn, is connected by a side-connection to brush 26 by the flexible shunt wire 36. In FIG.

8, the clip 14 is shown in dashed-line format, partially broken away, in order to allow a more clear illustration of the other features.

In a further aspect of the invention, the end cap body 12 includes a first set of raised, axially-extending lands 56 configured to guide the insertion of one of the legs 42 into its pocket 32. A second set of raised, axially-extending lands 56 is preferably also present for help guide the other one of the legs 42 into its pocket 32. As also shown, the key 50 cooperates with a corresponding keying slot in the end cap body 12 to obtain the proper orientation of the clip 14 relative to the body 12. Also shown is the axially-extending end wall 46 of the clip 14 over-laid on and in registration with the fixed wall 38 of end cap body 12. Also shown is the slot closure member 48 over-laid on and in registration with the brush well slot 34. Finally, FIG. 8 also shows that the leg 42 acts as a closure wall, closing off and sealing pocket 32. The flexible shunt wire 36 is allowed to pass through the notch 44 (with, perhaps some compression), extending through pocket 32 and finally terminating with the side connection to brush 26 by passing below the covering slot closure member 48.

Figure 9:
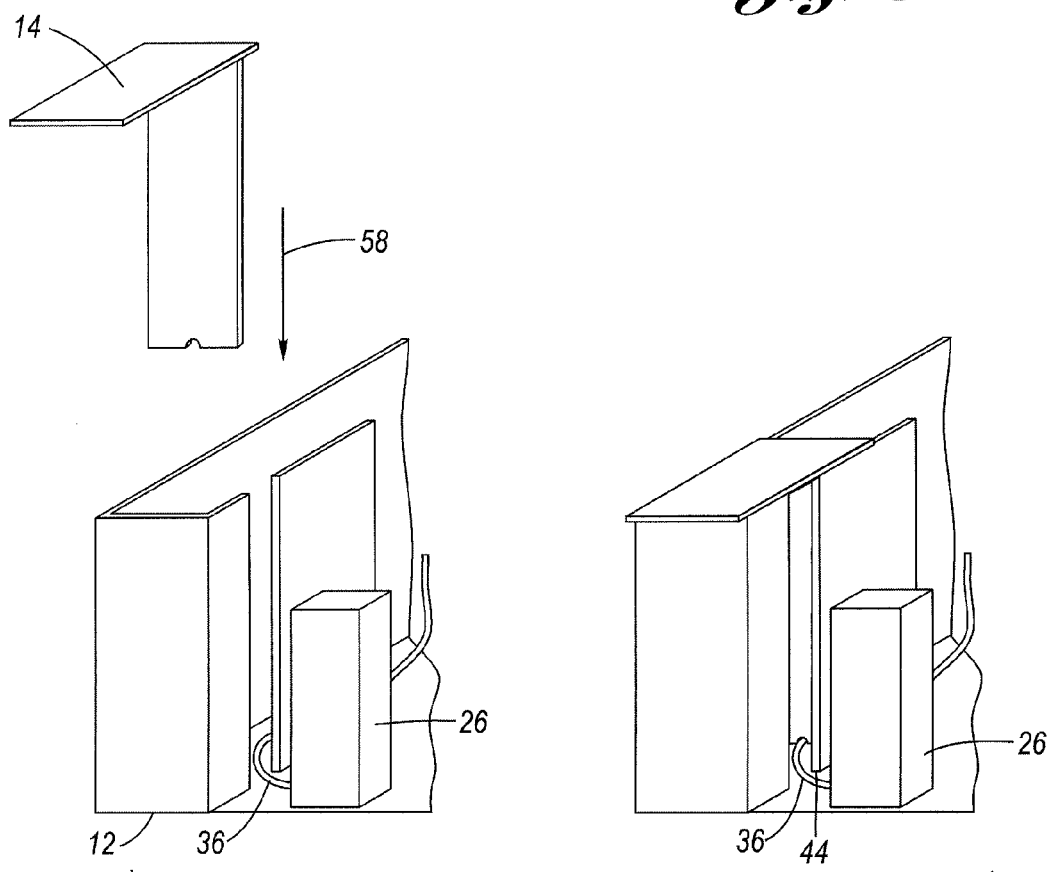
FIG. 9 is a diagrammatic representation of an assembly process of the end cap assembly of the present invention.

FIG. 9 is a diagrammatic, simplified view of the present invention. FIG. 9 shows that the clip 14, particularly the notch 44, when inserted in a direction 58 indicated in the Figure into the end cap body 12, forms a seal with the shunt wire 36 against the floor of the pocket. The pocket 32 is thereafter electrically isolated isolated.

The present invention provides a sealed pocket that is located adjacent to the motor brush well, and which contains and electrically isolates the flexible shunt wire. The occurrence of electrolysis is reduced or eliminated due to the highly resistive electrical path between either one of the flexible shunt wires and surfaces of opposite electrical polarity. The sealed pocket is formed by the mating surfaces of the end cap body (carrier) and the clip. The end cap body provides walls that form several sides of the pocket but allow for an open end which permits insertion of the shunt wire and the RFI suppression circuit termination wire during assembly. The mating clip completes the pocket wall by providing surfaces that seal any remaining openings. In an alternate embodiment, interlocking surfaces and/or a secondary gasket material may be used to improve the sealing between the mating surfaces. As is common to side-connected shunt wire-to-brush designs, a slot is provided on the side of the brush well to allow the shunt wire to travel with the brush movement. In alternate brush carrier designs, the spring end of the brush well is also sealed by the secondary clip. The top surface of the clip seals both the spring end of the brush bore and the top of the shunt pocket. Isolation legs extend perpendicularly downward from the top surface of the clip and fit into slotted keyways in the side of the shunt pocket walls upon inserting. The bottom ends of the isolation legs are concaved to fit with the shunt wire/inductor wire and form the lower seal with the shunt pocket. The top surface and isolation legs of the clip complete the walls needed to create an electrically isolated pocket for the shunt wire. These sealing surfaces could be enhanced by using a gasket material at the interface surfaces. The brush end of the well is sealed by a close running slip fit between the well inside diameter (ID) and the brush outside diameter (OD) profile.

The sealed pocket design of the present invention also helps protect the shunt wire from corrosion by limiting the exposure to chemical agents found in fuels, such as sulfur. The sealed pocket minimizes or prevents replenishing of the chemical agent from the surrounding fuel. Accordingly, the concentration of any such corrosive chemical agent is reduced in the pocket volume and the corrosion is reduced or eliminated.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An end cap assembly for an in-tank fuel pump, comprising:
    an end cap body having an axis configured to close an opening of a pump housing, said body including a fuel outlet and a connector having positive and negative polarity electrical terminals, said body further including a pair of brush wells which receive a corresponding pair of motor brushes and opening towards a side of said body opposite said outlet, said body further includes a pair of blind bores which each receive a respective radio frequency interference (RFI) suppression circuit, said body further including a pair of pockets adjacent to said wells which allow a pair of flexible shunt wires to connect said brushes to said RFI suppression circuits; wherein each of said wells has a respective, axially-extending slot to allow for travel of the flexible shunt wires; and
    a clip inserted into said end cap body, said clip having a main base with a pair of axially-extending legs, said legs capturing said flexible shunt wires; wherein upon insertion into said end cap body said clip forms a closure wall closing said pockets.

2. The assembly of claim 1 wherein said legs each include a notch on a distal end thereof configured to capture a respective one of said flexible shunt wires.

3. The assembly of claim 2 wherein said notch is concave and is sized to capture said flexible shunt wire while creating a seal against a floor of said pocket.

4. The assembly of claim 1 wherein said end cap body includes a set of axially-extending lands configured to guide insertion of one of said legs.

5. The assembly of claim 4 wherein said set is a first set, said end cap body further includes a second set of axially-extending lands configured to guide insertion of the other one of said legs.

6. The assembly of claim 1 wherein each pocket includes a respective fixed wall, said clip including a pair of an axially-extending end walls configured to abut said fixed walls.

7. The assembly of claim 1 wherein said clip includes a pair of slot closure members, each slot closure member being configured to cover said slots.

8. The assembly of claim 1 wherein said housing is configured to be disposed in a fuel reservoir.

9. The assembly of claim 1 wherein said RFI suppression circuits each comprise a respective coil and ferromagnetic core.

10. The assembly of claim 1 wherein said flexible shut wires are side-mounted to said brushes.

11. The assembly of claim 1 wherein said flexible shunt wires comprise braided wire.

\* \* \* \* \*